US010700350B2

(12) United States Patent
Takami et al.

(10) Patent No.: US 10,700,350 B2
(45) Date of Patent: *Jun. 30, 2020

(54) NONAQUEOUS ELECTROLYTE BATTERY AND BATTERY PACK

(71) Applicant: KABUSHIKI KAISHA TOSHIBA, Minato-ku (JP)

(72) Inventors: Norio Takami, Yokohama (JP); Hiroki Inagaki, Yokohama (JP); Takashi Kishi, Yokosuka (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 81 days.

This patent is subject to a terminal disclaimer.

(21) Appl. No.: 15/899,524

(22) Filed: Feb. 20, 2018

(65) Prior Publication Data

US 2018/0183056 A1 Jun. 28, 2018

Related U.S. Application Data

(63) Continuation of application No. 14/200,534, filed on Mar. 7, 2014, now abandoned.

(30) Foreign Application Priority Data

Mar. 26, 2013 (JP) .................................. 2013-064893
Feb. 13, 2014 (JP) .................................. 2014-025817

(51) Int. Cl.
*H01M 4/485* (2010.01)
*H01M 4/505* (2010.01)
*H01M 4/525* (2010.01)
*H01M 4/58* (2010.01)
*H01M 10/0525* (2010.01)
*H01M 10/0568* (2010.01)
*H01M 10/0569* (2010.01)

(52) U.S. Cl.
CPC .......... *H01M 4/485* (2013.01); *H01M 4/505* (2013.01); *H01M 4/525* (2013.01); *H01M 4/5825* (2013.01); *H01M 10/0525* (2013.01); *H01M 10/0568* (2013.01); *H01M 10/0569* (2013.01); *H01M 2300/004* (2013.01); *H01M 2300/0028* (2013.01); *H01M 2300/0034* (2013.01); *H01M 2300/0037* (2013.01); *Y02E 60/122* (2013.01)

(58) Field of Classification Search
CPC ...... H01M 4/485; H01M 4/505; H01M 4/525; H01M 4/5825; H01M 10/0525; H01M 10/0568; H01M 10/0569; H01M 2300/0034; H01M 2300/0037; H01M 2300/0028; H01M 2300/004; Y02E 60/122
See application file for complete search history.

(56) References Cited

U.S. PATENT DOCUMENTS

| | | |
|---|---|---|
| 2005/0147889 A1 | 7/2005 | Ohzuku et al. |
| 2005/0164082 A1 | 7/2005 | Kishi |
| 2005/0170250 A1 | 8/2005 | Ohzuku et al. |
| 2006/0204847 A1 | 9/2006 | Ohzuku et al. |
| 2006/0216600 A1 | 9/2006 | Inagaki et al. |
| 2007/0224515 A1 | 9/2007 | Xu et al. |
| 2011/0236752 A1 | 9/2011 | Kawakami et al. |
| 2012/0052401 A1 | 3/2012 | Goodenough |
| 2012/0094190 A1 | 4/2012 | Mimura et al. |
| 2012/0225346 A1 | 9/2012 | Hoshina et al. |
| 2013/0071753 A1* | 3/2013 | Kim .................. H01M 4/485 429/231.95 |

FOREIGN PATENT DOCUMENTS

| | | | |
|---|---|---|---|
| CN | 102306747 A | | 1/2012 |
| CN | 102655240 A | | 9/2012 |
| CN | 102891304 | | 1/2013 |
| CN | 103296311 | * | 9/2013 |
| EP | 1 530 248 A2 | | 5/2005 |
| EP | 2 503 625 A2 | | 9/2012 |
| JP | 2001-196061 A | | 7/2001 |
| JP | 2003-323893 A | | 11/2003 |
| JP | 2005-142047 | | 6/2005 |
| JP | 2006-221972 A | | 8/2006 |

(Continued)

OTHER PUBLICATIONS

Extended European Search Report dated Jul. 2, 2014 in Patent Application No. 14158371.6.
Office Action dated Aug. 31, 2015 in European Patent Application No. 14 158 371.6.
Office Action dated Feb. 10, 2015 in Japanese Patent Application No. 2014-025816 (with English language translation).
Office Action dated Feb. 17, 2015 in Japanese Patent Application No. 2014-025817 (with English language translation).
Office Action dated Jun. 30, 2015 in Japanese Patent Application No. 2014-025816 with English translation.

(Continued)

*Primary Examiner* — Laura Weiner
(74) *Attorney, Agent, or Firm* — Oblon, McClelland, Maier & Neustadt, L.L.P.

(57) ABSTRACT

According to one embodiment, a nonaqueous electrolyte battery includes a positive electrode, a negative electrode, and a nonaqueous electrolyte. The positive electrode includes at least one oxide selected from the group consisting of a first oxide having a spinel structure and represented by $Li_xNi_{0.5}Mn_{1.5}O_4$, a second metal phosphate having an olivine structure and represented by $Li_xMn_{1-w}Fe_wPO_4$, and a third oxide having a layered structure and represented by $Li_xNi_yMn_zCo_{1-y-z}O_2$. The nonaqueous electrolyte includes a first solvent. The first solvent includes at least one compound selected from the group consisting of trimethyl phosphate, triethyl phosphate, tripropyl phosphate, tributyl phosphate, and fluorinated phosphate ester.

13 Claims, 3 Drawing Sheets

(56) References Cited

FOREIGN PATENT DOCUMENTS

| | | |
|---|---|---|
| JP | 2007-305549 A | 11/2007 |
| JP | 2007-305574 A | 11/2007 |
| JP | 2008-27766 A | 2/2008 |
| JP | 2008-60076 A | 3/2008 |
| JP | 2008-117625 A | 5/2008 |
| JP | 2011-44245 A | 3/2011 |
| JP | 2012-74133 A | 4/2012 |
| JP | 2012-160345 | 8/2012 |
| JP | 2012-234766 A | 11/2012 |
| JP | 2013-152825 | 8/2013 |
| JP | 2014-209436 A | 11/2014 |
| WO | WO 2010/137156 A1 | 12/2010 |
| WO | WO 2012/077712 A1 | 6/2012 |
| WO | WO 2013/180781 A1 | 12/2013 |

OTHER PUBLICATIONS

Combined Office Action and Search Report dated Nov. 3, 2015 in Chinese Patent Application No. 201410091561.7 with English translation.
Notice of Allowance dated Apr. 18, 2017 in Japanese Patent Application No. 2015-086175.
Office Action dated Mar. 1, 2016 in Japanese Patent Application No. 2015-086175 with unedited computer generated English translation.
Office Action dated Mar. 1, 2016 in Japanese Patent Application No. 2015-086174 with unedited computer generated English translation.
Office Action dated Sep. 27, 2016, in corresponding Japanese Patent Application No. 2015-086174 (with English-language Translation— *no representation is made of its accuracy*).
Office Action dated Sep. 27, 2016, in corresponding Japanese Patent Application No. 2015-086175 (with English-language Translation— *no representation is made of its accuracy*).

* cited by examiner

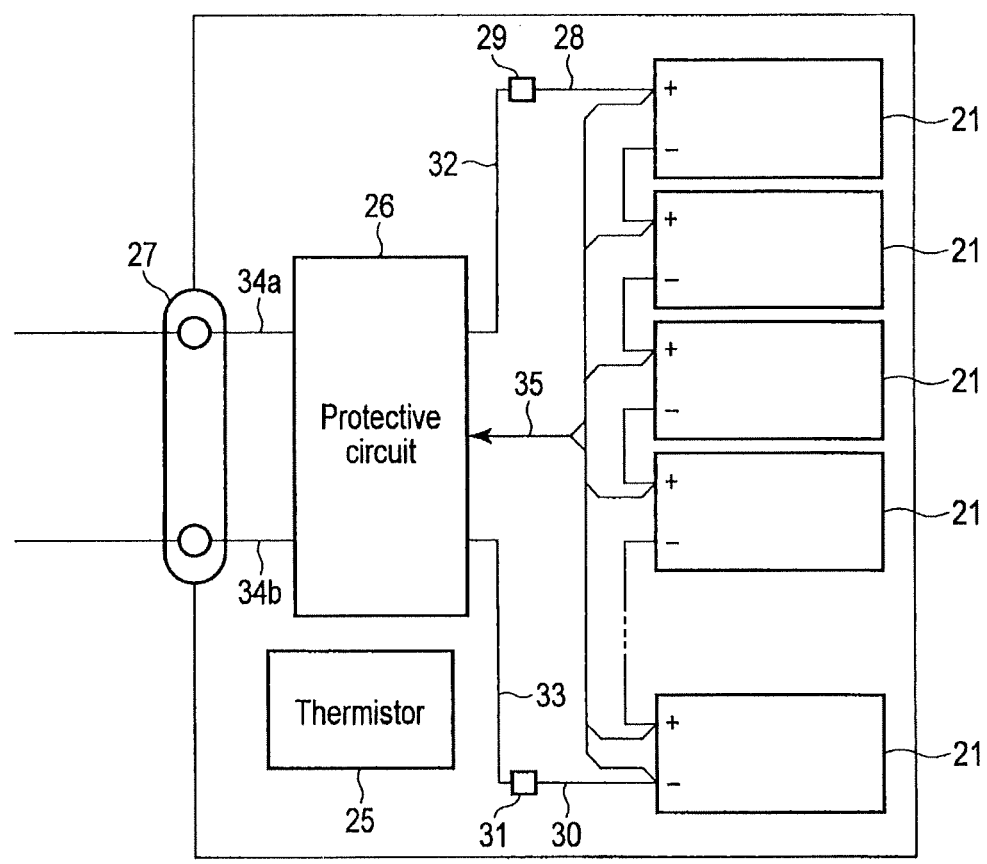
F I G. 3

US 10,700,350 B2

NONAQUEOUS ELECTROLYTE BATTERY AND BATTERY PACK

CROSS-REFERENCE TO RELATED APPLICATIONS

This application is a continuation of U.S. application Ser. No. 14/200,534, filed Mar. 7, 2014, now abandoned; which is based upon and claims the benefit of priority from Japanese Patent Applications No. 2013-064893, filed Mar. 26, 2013, and No. 2014-025817, filed Feb. 13, 2014, the entire contents of all of which are incorporated herein by reference.

FIELD

Embodiments described herein relate generally to a nonaqueous electrolyte battery and battery pack.

BACKGROUND

There has been much anticipation surrounding a nonaqueous electrolyte battery using a lithium metal, a lithium alloy, a lithium compound, or a carbonaceous material for a negative electrode as a high energy density battery, and much research and development have taken place of such. Hitherto, a lithium ion battery which contains a positive electrode containing $LiCoO_2$, $LiMn_2O_4$, $LiNi_{1/3}Co_{1/3}Mn_{1/3}O_2$, or $LiFePO_4$ as an active material and a negative electrode containing a carbonaceous material absorbing/releasing lithium has been widely put into practical use. A metal oxide or an alloy has been considered as a substitute for the carbonaceous material in the negative electrode.

Excellent cycle performance, thermal stability, and discharge rate performance under a high temperature environment are required for stationary large batteries and large batteries for vehicles which have high energy and provide high output. It is necessary to attain a battery satisfying all such performances.

BRIEF DESCRIPTION OF THE DRAWINGS

FIG. 3 is a block diagram showing an electric circuit of the battery pack of FIG. 2.

DETAILED DESCRIPTION

Figure 1:
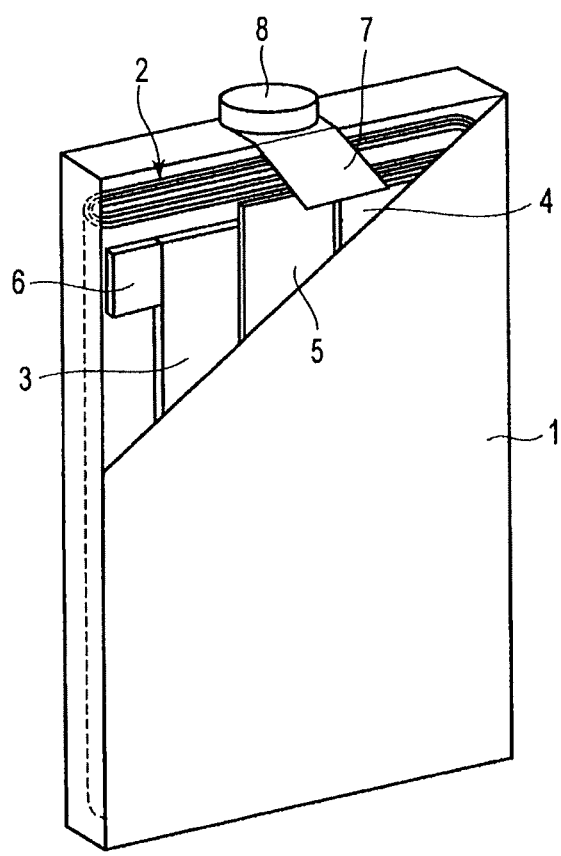
FIG. 1 is a partially cut perspective view schematically showing a nonaqueous electrolyte battery according to an embodiment.

According to the embodiment, there is provided a nonaqueous electrolyte battery including a positive electrode, a negative electrode, and a nonaqueous electrolyte. The positive electrode contains at least one of a first oxide having a spinel structure and represented by $Li_xNi_{0.5}Mn_{1.5}O_4$ ($0<x\leq1.1$) and a second metal phosphate (second oxide) having an olivine structure and represented by $Li_xMn_{1-w}Fe_wPO_4$ ($0\leq x<1.1$, $0\leq w\leq0.5$). The negative electrode contains a titanium-containing oxide. The nonaqueous electrolyte contains a nonaqueous solvent and $LiPF_6$ dissolved in the nonaqueous solvent. The nonaqueous solvent contains a first solvent. The first solvent includes at least one compound selected from the group consisting of trimethyl phosphate, triethyl phosphate, tripropyl phosphate, and tributyl phosphate, and/or fluorinated phosphate esters of the at least one compound.

According to the embodiment, there is provided a nonaqueous electrolyte battery including a positive electrode, a negative electrode, and a nonaqueous electrolyte. The positive electrode includes at least one oxide selected from the group consisting of a first oxide having a spinel structure and represented by $Li_xNi_{0.5}Mn_{1.5}O_4$ ($0<x\leq1.1$), a second metal phosphate (second oxide) having an olivine structure and represented by $Li_xMn_{10w}Fe_wPO_4$ ($0<x\leq1.1$, $0\leq w\leq0.5$), and a third oxide having a layered structure and represented by $Li_xNi_yMn_zCo_{1-y-z}O_2$ ($0<x\leq1.1$, $0.3\leq y<1$, $0\leq z\leq0.5$). The negative electrode includes a titanium-containing oxide. The nonaqueous electrolyte includes a nonaqueous solvent and an electrolyte dissolved in the nonaqueous solvent. The nonaqueous solvent includes a first solvent. The first solvent includes at least one compound selected from the group consisting of trimethyl phosphate, triethyl phosphate, tripropyl phosphate, tributyl phosphate and fluorinated phosphate ester.

The embodiment provides a battery pack containing the nonaqueous electrolyte battery according to the embodiments.

First Embodiment

A first embodiment provides a nonaqueous electrolyte battery containing a positive electrode, a negative electrode, and a nonaqueous electrolyte. The positive electrode contains at least one of a first oxide having a spinel structure and represented by $Li_xNi_{0.5}Mn_{1.5}O_4$ ($0<x\leq1.1$) and a second metal phosphate (second oxide) having an olivine structure and represented by $Li_xMn_{1-w}Fe_wPO_4$ ($0<x\leq1.1$, $0\leq w\leq0.5$). The negative electrode contains a titanium-containing oxide. The nonaqueous electrolyte contains a nonaqueous solvent and $LiPF_6$ dissolved in the nonaqueous solvent. The nonaqueous solvent contains a first solvent. The first solvent includes at least one compound selected from the group consisting of trimethyl phosphate ($PO(OCH_3)_3$), triethyl phosphate ($PO(OC_2H_5)_3$) tripropyl phosphate ($PO(OC_3H_7)_3$), and tributyl phosphate ($PO(OC_4H_9)_3$), and/or fluorinated phosphate esters of the at least one compound. The first solvent can be used singly or in combination of two or more.

In order to attain a battery having high performance, enhanced life, and high safety, a nonaqueous electrolytic solution which contains $LiBF_4$ as an electrolyte, and a mixed solvent containing phosphate ester and γ-butyrolactone (GBL) as a nonaqueous solvent is considered to be used. Although GBL has excellent ion conductivity, $LiBF_4$ does not readily dissociate in the phosphate ester. Therefore, the nonaqueous electrolyte has poor ion conductivity. If $LiPF_6$ is used in place of $LiBF_4$, hydrogen fluoride (HF) generated from $LiPF_6$ is reacted with GBL, to produce the ring-opening polymerization reaction of GBL, resulting in acceleration of the decomposition of the nonaqueous electrolyte. Furthermore, GBL has a high viscosity, and is apt to react with the positive electrode.

The nonaqueous electrolyte which contains the nonaqueous solvent containing a phosphate ester such as trimethyl phosphate, triethyl phosphate, tripropyl phosphate, tributyl phosphate, or fluorinated phosphate esters of these compounds, and $LiPF_6$ dissolved in the nonaqueous solvent has a high dissociation degree of a lithium salt. Therefore, the nonaqueous electrolyte has excellent ion conductivity, and is useful for improving discharge rate performance. However, if a graphite material, lithium, or a lithium alloy is used for the negative electrode, the reductive decomposition reduction of the nonaqueous electrolyte is accelerated, which causes problems of a decrease in life performance and generation of a gas. This makes it difficult to put the nonaqueous electrolyte battery into practical use.

As in the embodiment, the use of the negative electrode containing the titanium-containing oxide suppresses a reduction side reaction in the negative electrode under a high temperature environment such as 45° C., which can suppress the generation of the gas. Therefore, excellent charge/discharge cycle performance even under a high temperature environment can be obtained. Since the first oxide having the spinel structure and represented by $Li_xNi_{0.5}Mn_{1.5}O_4$ (0<x≤1.1) and the second metal phosphate having the olivine structure and represented by $Li_xMn_{1-w}Fe_wPO_4$ (0<x≤1.1, 0≤w≤0.5) can enable a high capacity at a high voltage of 4 V or more, a battery capacity can be increased. This is because the combination of the positive electrode with the nonaqueous electrolyte of the embodiment can suppress the oxidation decomposition of the nonaqueous electrolyte even under a high-temperature and high-pressure environment, which enables the charge of the positive electrode to a high-voltage range of 4 V or more and an increase in the capacity of the positive electrode. Furthermore, the first oxide and the second metal phosphate have higher thermal stability than that of a lithium metal composite oxide containing a transition metal containing Ni and at least one selected from the group consisting of Mn, Fe, Co, Ti, and Cu, as metal elements and having a layered structure, respectively. This can suppress the oxidation reaction of the nonaqueous electrolyte involving heat generation under a high temperature of 150° C. or more and an increase in a battery temperature, and can improve safety.

As described above, the first embodiment can provide a nonaqueous electrolyte battery having high safety under a high temperature environment, excellent charge/discharge cycle performance even under a high temperature environment, high discharge rate performance, and a high capacity.

The nonaqueous solvent further contains a second solvent containing at least one selected from the group consisting of propylene carbonate (PC), ethylene carbonate (EC), butylene carbonate (BC), diethyl carbonate (DEC), ethylmethyl sulfone (EMS), and ethylisopropyl sulfone (EiPS), and the content of the first solvent in the nonaqueous solvent is set to 30 to 90% by volume. This can further improve safety, charge/discharge cycle performance, discharge rate performance, and a capacity under a high temperature environment.

The titanium-containing oxide contains at least one selected from the group consisting of a lithium titanium oxide, a titanium oxide, and a niobium titanium composite oxide, which can further suppress the reduction decomposition of the nonaqueous electrolyte. Therefore, the amount of a gas generated under a high temperature environment can be further decreased, and cycle life performance under a high temperature environment can be further improved.

The battery of the embodiment can contain a separator interposed between the positive electrode and the negative electrode. The battery can further contain a case to house them and the nonaqueous electrolyte.

Hereinafter, the nonaqueous electrolyte, the negative electrode, the positive electrode, the separator, and the case will be described.

(1) Nonaqueous Electrolyte

The nonaqueous electrolyte contains a nonaqueous solvent and $LiPF_6$ dissolved in the nonaqueous solvent. The nonaqueous solvent contains a first solvent. The first solvent includes at least one compound selected from the group consisting of trimethyl phosphate ($PO(OCH_3)_3$), triethyl phosphate ($PO(OC_2H_5)_3$), tripropyl phosphate ($PO(OC_3H_7)_3$), and tributyl phosphate ($PO(OC_4H_9)_3$), and/or fluorinated phosphate esters of the at least one compound. The nonaqueous electrolyte has a boiling point of 200° C. or more. More preferably, the first solvent contains trimethyl phosphate or triethyl phosphate. Thereby, the oxidation resistance of the nonaqueous electrolyte under a high temperature and a high voltage can be improved.

The content of the first solvent in the nonaqueous solvent is desirably set to be within a range of 30 to 90% by volume. Thereby, the battery having excellent thermal stability and cycle life performance can be provided. The content is more preferably within a range of 40% by volume or more and 80% by volume or less.

Examples of the fluorinated phosphate esters include trifluoromethyl phosphate ($PO(OCF_3)_3$), trifluoroethyl phosphate ($PO(OCH_2CF_3)_3$), trifluoropropyl phosphate ($PO(OC_2H_4CF_3)_3$), and trifluorobutyl phosphate ($PO(OC_3H_6CF_3)_3$). Preferable examples thereof include trifluoromethyl phosphate or trifluoroethyl phosphate. Thereby, the oxidation resistance of the nonaqueous electrolyte under a high temperature and a high voltage can be improved.

Desirably, the nonaqueous solvent further contains the second solvent containing at least one selected from the group consisting of propylene carbonate (PC), ethylene carbonate (EC), butylene carbonate (BC), diethyl carbonate (DEC), ethylmethyl sulfone (EMS), and ethylisopropyl sulfone (EiPS). Thereby, the ion conductivity of the nonaqueous electrolyte can be increased. The second solvent preferably contains propylene carbonate (PC), diethyl carbonate (DEC) or ethylisopropyl sulfone (EiPS). Thereby, since the ion conductivity of the nonaqueous electrolyte can be improved, the discharge rate performance and low temperature performance of the battery can be improved.

The electrolyte dissolved in the nonaqueous solvent may be made of only lithium hexafluorophosphate ($LiPF_6$) or may be a mixture of $LiPF_6$ and a lithium salt other than $LiPF_6$. Examples of the lithium salt other than $LiPF_6$ include lithium perchlorate ($LiClO_4$), hexafluoro arsenic lithium ($LiAsF_6$), lithium trifluoromethasulfonate ($LiCF_3SO_3$), bis-trifluoromethylsulfonylimide lithium [$LiN(CF_3SO_2)_2$], $LiN(C_2F_5SO_2)_2$, $LiN(FSO_2)_2$, $Li(CF_3SO_2)_3C$, and $LiB[(OCO)_2]_2$. These electrolytes can be used singly or in combination of two or more. Since the electrolyte containing $LiPF_6$ and $LiB[(OCO)_2]_2$ can increase the chemical stability of the first solvent and can decrease film resistance on the negative electrode, the low temperature performance and the cycle life performance can be significantly improved.

Since the first solvent has a high dielectric constant although the first solvent has a low viscosity, a high-concentration lithium salt can be dissolved in the nonaqueous solvent. The concentration of the electrolyte in the nonaqueous solvent is preferably set to be within a range of 1 to 2.5 mol/L. A decrease in a lithium ion concentration on the interface between the positive electrode and the nonaqueous electrolyte during discharge in a large current can be suppressed by setting the concentration of the electrolyte to 1 mol/L or more. An increase in a viscosity of the nonaqueous electrolyte can be suppressed by setting the concentration of the electrolyte to 2.5 mol/L or less. Therefore, high output can be obtained under a low temperature environment by setting the concentration of the electrolyte to be within the range of 1 to 2.5 mol/L The nonaqueous electrolyte may contain a polymer material, or a room temperature molten salt containing a noninflammable ionic liquid having no volatility. Examples of the polymer material include polyvinylidene fluoride (PVdF), polyacrylonitrile (PAN), and polyethylene oxide (PEO). A composite of a liquefied nonaqueous electrolyte (nonaqueous electrolytic solution) containing the nonaqueous solvent in which the electrolyte (for example, lithium salt) is dissolved, and a polymer material is formed, to produce a gel-like electrolyte.

(2) Negative Electrode

The negative electrode contains a negative electrode current collector, and a negative electrode material layer (negative electrode active material-containing layer) supported on one surface or both surfaces of the current collector. The negative electrode material layer contains an active material, a conductive agent, and a binder.

The negative electrode active material contains titanium-containing oxide particles. Examples of the titanium-containing oxide include a lithium titanium oxide, a titanium oxide, and a niobium titanium composite oxide.

Examples of the lithium titanium oxide include $Li_{4+x}Ti_5O_{12}$ ($-1 \leq x \leq 3$) having a spinel structure and $Li_{2+x}Ti_3O_7$ ($-1 \leq x \leq 3$) having a ramsdelite structure.

Examples of the titanium oxide include $TiO_2$ having an anatase structure and monoclinic $TiO_2(B)$. $TiO_2(B)$ is preferably heat-treated at 300 to 500° C. $TiO_2(B)$ preferably contains 0.5 to 10% by weight of Nb. Thereby, the capacity of the negative electrode can be increased. Since irreversible lithium may remain in the titanium oxide after the battery is charged and discharged, the titanium oxide after the battery is charged and discharged can be represented by $Li_dTiO_2$ ($0 < d \leq 1$).

Examples of the niobium titanium composite oxide include $Li_xNb_aTi_bO_c$ ($0 \leq x \leq 3$, $0 < a \leq 3$, $0 < b \leq 3$, $5 \leq c \leq 10$). Examples of $Li_xNb_aTi_bO_c$ include $Li_xNb_2TiO_7$, $Li_xNb_2Ti_2O_9$, and $Li_xNbTiO_5$. $Li_xTi_{1-y}Nb_yNb_2O_{7+\sigma}$ ($0 \leq x \leq 3$, $0 \leq y \leq 1$, $0 \leq \sigma \leq 0.3$) heat-treated at 800° C. to 1200° C. has a high true density, and can increase a volume specific capacity. $Li_xNb_2TiO_7$ has a high density and a high capacity, which is preferable. Thereby, the capacity of the negative electrode can be increased. A part of Nb or Ti in the above oxides may be substituted with at least one element selected from the group consisting of V, Zr, Ta, Cr, Mo, W, Ca, Mg, Al, Fe, Si, B, P, K, and Na.

At least a part of the surface of the titanium-containing oxide particles is preferably covered with a carbon material. This increases an electron conduction network in the electrode to reduce electrode resistance, thereby improving large current performance.

The specific surface area of the negative electrode active material particles measured by the BET method by $N_2$ adsorption is desirably 3 $m^2/g$ or more and 50 $m^2/g$ or less. Since the aggregation of the particles can be decreased by setting the specific surface area to 3 $m^2/g$ or more, the affinity between the negative electrode and the nonaqueous electrolyte can be increased, and the interface resistance of the negative electrode can be decreased. Therefore, output performance and charge/discharge cycle performance can be improved. Since the nonaqueous electrolyte can be uniformly dispersed in the positive electrode and the negative electrode by setting the specific surface area to 50 $m^2/g$ or less, the output performance and the charge/discharge cycle performance can be improved. The range of the specific surface area is more preferably 5 to 50 $m^2/g$.

Preferably, in the negative electrode active material particles, the average particle diameter of secondary particles diameters is 10 μm or less, and a primary particle diameter is 1 μm or less. Thereby, the affinity between the negative electrode and the nonaqueous electrolyte can be further increased. The reduction side reaction of the nonaqueous electrolyte under a high temperature environment is suppressed, and high temperature cycle life performance and thermal stability are increased.

The negative electrode material layer is desirably a porous layer. The porosity of the negative electrode material layer is desirably set to be within a range of 20 to 50%. Thereby, the negative electrode having excellent affinity between the negative electrode and the nonaqueous electrolyte and a high density can be obtained. The porosity is more preferably within a range of 25 to 40%.

The negative electrode current collector is desirably an aluminium foil or an aluminum alloy foil. The thicknesses of the aluminum foil and the aluminum alloy foil are preferably set to 20 μm or less, and more preferably 15 μm or less. The purity of the aluminum foil is preferably 99.99 wt % or more. The aluminium alloy preferably contains at least one element selected from the group consisting of Mg, Zn, and Si. On the other hand, the content of transition metals such as Fe, Cu, Ni, or Cr is preferably set to 100 wt-ppm or less.

As the conductive agent, for example, a carbon material can be used. Examples of the carbon material include acetylene black, carbon black, corks, carbon fiber, graphite, aluminum powder, and TiO. Corks heat-treated at a temperature of 800 to 2000° C. and having an average particle diameter of 10 μm or less, graphite, and TiO powder, and carbon fiber having an average particle diameter of 1 μm or less are preferable. The BET specific surface area, based on $N_2$ adsorption, of the carbon material is preferably 10 $m^2/g$ or more.

Examples of the binder include polytetrafluoroethylene (PTFE), polyvinylidene fluoride (PVdF), fluorine-based rubber, styrene butadiene rubber, and a core shell binder.

The formulating ratios of the negative electrode active material, the conductive agent, and the binder are preferably set to be within a range of 80 to 95% by weight, within a range of 3 to 18% by weight, and within a range of 2 to 7% by weight, respectively.

The negative electrode is produced by, for example, suspending the negative electrode active material, the conductive agent, and the binder in a suitable solvent, applying the slurry onto the current collector, drying the current collector, and subjecting the current collector to a heat press.

(3) Positive Electrode

The positive electrode contains a positive electrode current collector and a positive electrode material layer (positive electrode active material-containing layer) supported on one surface or both surfaces of the current collector. The positive electrode material layer contains an active material, a conductive agent, and a binder.

Positive electrode active material particles contain at least one of first oxide particles having a spinel structure and represented by $Li_xNi_{0.5}Mn_{1.5}O_4$ ($0 < x \leq 1.1$) and second metal phosphate particles having an olivine structure and represented by $Li_xMn_{1-w}Fe_wPO_4$ ($0 < x \leq 1.1$, $0 \leq w \leq 0.5$). In the second metal phosphate, the lower limit of w is desirably more than 0 (excluding 0), and the upper limit thereof is preferably set to 0.2 or less. Preferable examples of the second metal phosphate include $LiMn_{0.85}Fe_{0.15}PO_4$.

The specific surface area of the positive electrode active material particles measured by the BET method is preferably within a range of 0.1 to 5 $m^2/g$.

Examples of the conductive agent include acetylene black, carbon black, and graphite.

Examples of the binder include polytetrafluoroethylene (PTFE), polyvinylidene fluoride (PVdF), and fluorine-based rubber.

The formulating ratios of the positive electrode active material, the conductive agent, and the binder are preferably set to be within a range of 80 to 95% by weight, within a range of 3 to 19% by weight, and within a range of 1 to 7% by weight, respectively.

The positive electrode current collector is preferably an aluminium foil or an aluminum alloy foil. The thickness of the positive electrode current collector is preferably 20 μm or less, and more preferably 15 μm or less.

The positive electrode is produced by, for example, suspending the positive electrode active material, the conductive agent, and the binder in a suitable solvent, applying the slurry onto the positive electrode current collector, drying the positive electrode current collector, and subjecting the positive electrode current collector to a press.

(4) Separator

Examples of the separator include a synthetic resin nonwoven fabric, a polyethylene porous film, a polypropylene porous film, and a cellulose nonwoven fabric.

(5) Case

A metal case and a case formed of a laminate film may be used for the case.

A metal can made of aluminium, an aluminium alloy, iron, stainless steel or the like and having a rectangular shape and a cylindrical shape may be used as the metal case. The plate thickness of the case is desirably set to 0.5 mm or less, and more preferably 0.3 mm or less.

Examples of the laminate film include a multilayer film prepared by covering an aluminium foil with a resin film. Polymer materials such as polypropylene (PP), polyethylene (PE), nylon, and polyethylene terephthalate (PET) may be used as the resin. The thickness of the laminate film is preferably set to 0.2 mm or less. The purity of the aluminium foil is preferably 99.5 wt % or more. An aluminium alloy for the metal can is preferably an alloy containing elements such as Mn, Mg, Zn, or Si and having an aluminum purity of 99.8 wt % or less. The strength of the metal can made of an aluminium alloy is increased, which can reduce the thickness of the can. As a result, a thin, light battery having a high output and excellent heat releasing property can be attained.

An example of a nonaqueous electrolyte battery of the first embodiment is shown in FIG. 1. A flat or thin nonaqueous electrolyte battery shown in FIG. 1 contains a case 1 having a rectangular parallelepiped shape and made of an aluminium alloy, an electrode group 2 housed in the case 1, and a nonaqueous electrolyte (not shown) housed in the case 1 and held by the electrode group 2. The electrode group 2 has a flat structure in which a positive electrode 3 and a negative electrode 4 are spirally wound with a separator 5 interposed therebetween. The electrode group 2 is produced by, for example, spirally winding the positive electrode 3 and the negative electrode 4 with the separator 5 interposed therebetween such that the wound body has a flat shape, and thereinafter subjecting the wound body to a heat press. A rectangular positive electrode lead 6 is electrically connected to the positive electrode 3. On the other hand, a rectangular negative electrode lead 7 is electrically connected to the negative electrode 4. The positive electrode lead 6 is electrically connected to the case 1. The negative electrode lead 7 is electrically connected to a negative electrode terminal 8 insulated from the case 1.

Since the nonaqueous electrolyte battery of the first embodiment contains the positive electrode containing at least one of the first oxide and the second metal phosphate, the negative electrode containing the titanium-containing oxide, and the nonaqueous electrolyte containing $LiPF_6$ and the first solvent, the nonaqueous electrolyte battery having high safety under a high temperature environment, excellent charge/discharge cycle performance even under a high temperature environment, high discharge rate performance, and a high capacity can be provided.

Since the nonaqueous electrolyte battery of the first embodiment contains the positive electrode containing at least one of the first oxide and the second metal phosphate, the negative electrode containing the titanium-containing oxide, and the nonaqueous electrolyte containing $LiPF_6$ and the first solvent, the nonaqueous electrolyte battery having high safety under a high temperature environment, excellent charge/discharge cycle performance even under a high temperature environment, high discharge rate performance, and a high capacity can be provided.

The first embodiment can use a positive electrode (hereinafter, referred to as a positive electrode B) containing at least one oxide selected from the group consisting of the first oxide having the spinel structure and represented by $Li_xNi_{0.5}Mn_{1.5}O_4$ ($0<x\le1.1$), the second metal phosphate having the olivine structure and represented by $Li_xMn_{1-w}Fe_wPO_4$ ($0<x\le1.1$, $0\le w\le0.5$), and the third oxide having the layered structure and represented by $Li_xNi_yMn_zCo_{1-y-z}O_2$ ($0<x\le1.1$, $0.3\le y<1$, $0\le z\le0.5$) in place of the above positive electrode (hereinafter, referred to as a positive electrode A).

Since the positive electrode containing the third oxide can realise a high capacity at a high voltage of 4 V or more, the capacity of the battery can be increased. As the ranges of x, y, and z, $0.2\le x\le1.0$, $0.5\le y\le0.9$, and $0.1\le z\le0.3$ are more preferably set. The third oxide more preferably has a composition satisfying $0.5\le y\le1$. Examples of the composition satisfying $0.5\le y\le1$ include $LiNi_{0.6}Co_{0.2}Mn_{0.2}O_2$ and $LiNi_{0.8}CO_{0.1}Mn_{0.1}O_2$.

When the positive electrode contains the third oxide, a nonaqueous electrolyte (hereinafter, referred to as a nonaqueous electrolyte B) which contains the nonaqueous solvent containing the first solvent containing the fluorinated phosphate ester, and the electrolyte dissolved in the nonaqueous solvent can be used in place of the above nonaqueous electrolyte (hereinafter, referred to as a nonaqueous electrolyte A). Since the nonaqueous electrolyte B has excellent oxidation resistance to the positive electrode containing the third oxide, the nonaqueous electrolyte B can suppress the oxidation decomposition of the nonaqueous electrolyte involving heat generation under a high temperature of 150° C. or more. As a result, the nonaqueous electrolyte battery having high safety under a high temperature environment, excellent charge/discharge cycle performance even under a high temperature environment, high discharge rate performance, and a high capacity can be provided.

Examples of the fluorinated phosphate esters include trifluoromethyl phosphate, trifluoroethyl phosphate, trifluoropropyl phosphate, and trifluorobutyl phosphate. Preferable examples thereof include trifluoromethyl phosphate or trifluoroethyl phosphate. Thereby, the oxidation resistance of the nonaqueous electrolyte under a high temperature and a high voltage can be improved.

The content of the first solvent in the nonaqueous solvent is desirably set to be within a range of 30 to 90% by volume. Thereby, the battery having excellent thermal stability and cycle life performance can be provided. The content is more preferably within a range of 40% by volume or more and 80% by volume or less.

The nonaqueous solvent desirably contains the above second solvent. Thereby, the ion conductivity of the nonaqueous electrolyte can be increased. The second solvent preferably contains propylene carbonate (PC), diethyl carbonate (DEC) or ethylisopropyl sulfone (EiPS). Thereby, since the ion conductivity of the nonaqueous electrolyte can be improved, the discharge rate performance and low temperature performance of the battery can be improved.

Examples of the electrolyte dissolved in the nonaqueous solvent include, but are not particularly limited to, lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bis-trifluoromethylsulfonylimide lithium[$LiN(CF_3SO_2)_2$], $LiN(C_2F_5SO_2)_2$, $LiN(FSO_2)_2$, $Li(CF_3SO_2)_3C$, and $LiB[(OCO)_2]_2$. These electrolytes can be used singly or in combination of two or more. The electrolyte preferably contains $LiPF_6$. The nonaqueous solvent containing the first solvent containing the fluorinated phosphate esters has excellent solubility of $LiPF_6$. For this reason, the conductivity of the nonaqueous electrolyte can be increased by use of the electrolyte containing $LiPF_6$ and the first solvent containing the fluorinated phosphate esters. As a result, the discharge rate performance of the battery can further be improved.

The concentration of the electrolyte in the nonaqueous solvent is preferably set to be within a range 1 to 2.5 mol/L. Thereby, the high output can be obtained even under a low temperature environment.

The nonaqueous electrolyte may contain a polymer material or a room temperature molten salt containing a noninflammable ionic liquid having no volatility. Examples of the polymer material include the same materials as those described in the nonaqueous electrolyte A.

Since the nonaqueous electrolyte battery of the first embodiment contains the positive electrode containing at least one oxide selected from the group consisting of the first oxide, the second metal phosphate, and the third oxide, the negative electrode containing the titanium-containing oxide, and the nonaqueous electrolyte containing the first solvent, the nonaqueous electrolyte battery having high safety under a high temperature environment, excellent charge/discharge cycle performance even under a high temperature environment, high discharge rate performance, and a high capacity can be provided.

Second Embodiment

A second embodiment provides a battery pack containing the nonaqueous electrolyte battery of the first embodiment as a unit cell. The number of the unit cells used for the battery pack may be set to one or plural. When the battery pack contains a plurality of unit cells, the unit cells may be series-connected or connected in parallel.

Figure 2:
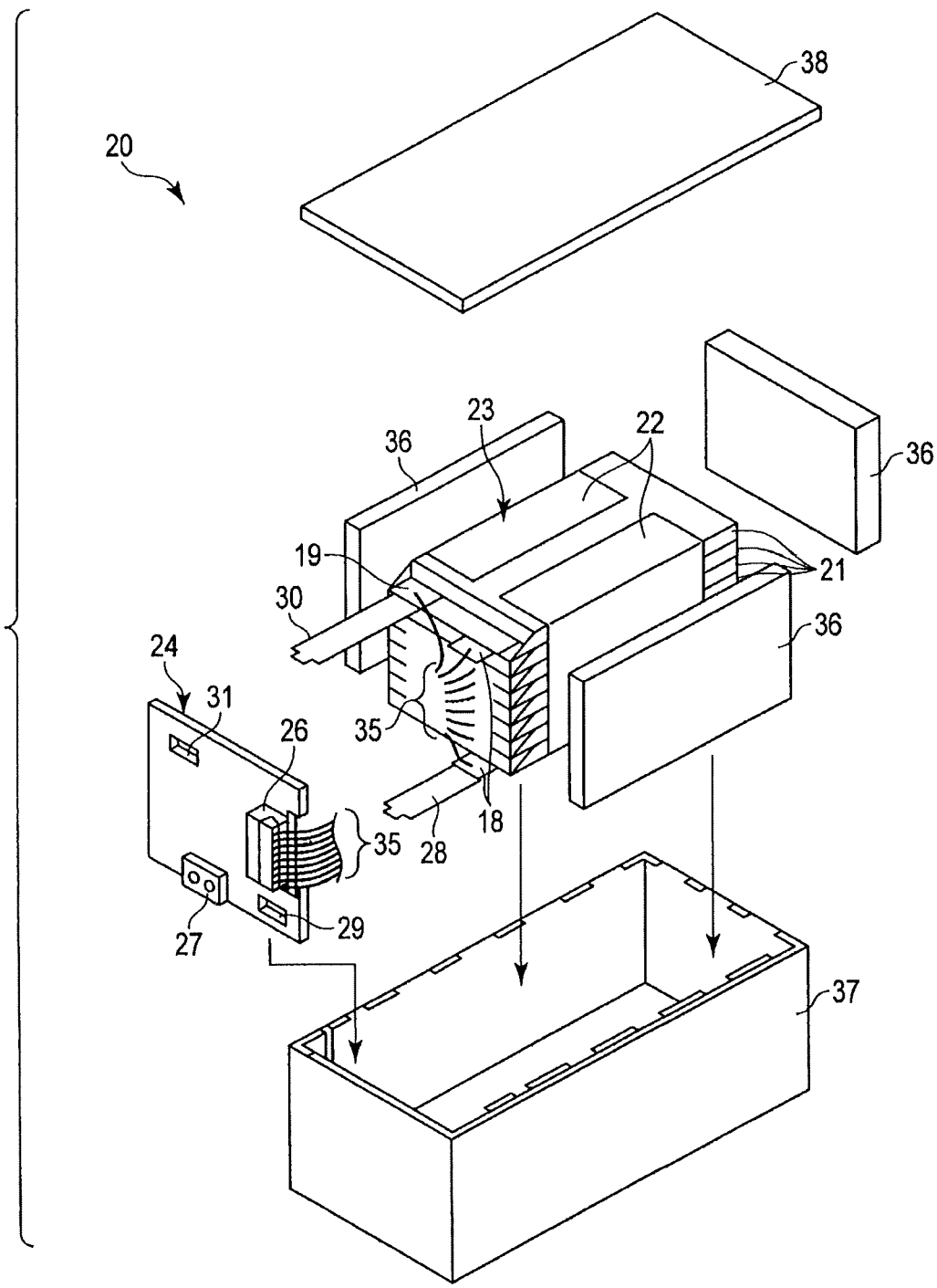
FIG. 2 is an exploded perspective view of a battery pack according to an embodiment.

The battery pack according to the second embodiment will be described with reference to the drawings. FIG. 2 and FIG. 3 show an example of a battery pack including a plurality of flat-type batteries.

An battery module 23 is configured by stacking the unit cells 21 so that a negative electrode terminal 19 extended outside and a positive electrode terminal 18 extended outside are arranged in the same direction and fastening them with an adhesive tape 22. The unit cells 21 are electrically connected in series as shown in FIG. 3.

A printed wiring board 24 is arranged opposed to the side surface of the unit cells 21 where the negative electrode terminal 19 and the positive electrode terminal 18 are extended. A thermistor 25, a protective circuit 26, and an energizing terminal 27 to an external instrument are mounted on the printed wiring board 24 as shown in FIG. 3. An electric insulating plate (not shown) is attached to the surface of the printed wiring board 24 facing the battery module 23 to avoid unnecessary connection of the wiring of the battery module 23.

A positive electrode lead 28 is connected to the positive electrode terminal 18 located at the bottom layer of the battery module 23 and the distal end is inserted into a positive electrode connector 29 of the printed wiring board 24 so as to be electrically connected. An negative electrode lead 30 is connected to the negative electrode terminal 19 located at the top layer of the battery module 23 and the distal end is inserted into an negative electrode connector 31 of the printed wiring board 24 so as to be electrically connected. The connectors 29 and 31 are connected to the protective circuit 26 through wirings 32 and 33 formed in the printed wiring board 24.

The thermistor 25 detects the temperature of the unit cells 21 and the detection signal is sent to the protective circuit 26. The protective circuit 26 can shut down a plus wiring 34a and a minus wiring 34b between the protective circuit 26 and the energizing terminals 27 to an external instrument under a predetermined condition. For example, the predetermined condition indicates when the detection temperature of the thermistor 25 becomes more than a predetermined temperature. Or, the predetermined condition indicates when the overcharge, overdischarge, and over-current of the unit cells 21 are detected. The overcharge detection may be performed on each of the unit cells 21 or the battery module 23. When each of the unit cells 21 is detected, the cell voltage may be detected, or positive electrode or negative electrode potential may be detected.

In the case of the latter, a lithium electrode to be used as a reference electrode is inserted into each of the unit cells 21. In the case of FIGS. 2 and 3, wirings 35 for voltage detection are connected to the unit cells 21 and detection signals are sent to the protective circuit 26 through the wirings 35.

Protective sheets 36 comprising rubber or resin are arranged on three side surfaces of the battery module 23 except the side surface in which the positive electrode terminal 18 and the negative electrode terminal 19 are protruded.

The battery module 23 is housed in a housing container 37 together with each of the protective sheets 36 and the printed wiring board 24. That is, the protective sheets 36 are arranged on both internal surfaces in a long side direction of the housing container 37 and on one of the internal surface at the opposite side in a short side direction. The printed wiring board 24 is arranged on the other internal surface in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tube, and thermally shrinking the heat-shrinkable tube.

In FIGS. 2 and 3, the form in which the unit cells 21 are connected in series is shown. However, in order to increase the battery capacity, the cells may be connected in parallel. Alternatively, the cells may be formed by combining series connection and parallel connection. The battery module packs can be connected in series or in parallel each other.

The embodiments of the battery pack is appropriately changed according to the use. The battery pack is used suitably for the application which requires the excellent cycle performance at a high current. It is used specifically as a power source for digital cameras, for vehicles such as two- or four-wheel hybrid electric vehicles, for two- or four-wheel electric vehicles, and for assisted bicycles. Particularly, it is suitably used as a battery for automobile use.

Since the battery pack of the second embodiment contains the nonaqueous electrolyte battery of the first embodiment, the battery pack having high safety under a high temperature environment, excellent charge/discharge cycle performance even under a high temperature environment, high discharge rate performance, and a high capacity can be attained.

EXAMPLES

Hereinafter, Examples of the present invention will be described in detail with reference to the drawings. However, the present invention is not limited to these examples.

Example 1

$LiMn_{0.85}Fe_{0.15}PO_4$ particles having an average particle diameter of 3 µm and a specific surface area of 0.8 m²/g measured by the BET method by $N_2$ adsorption, and having an olivine structure were used as a positive electrode active material. By weight, 8% of graphite powder as a conductive agent based on the entire positive electrode, and 5% by weight of PVdF as a binder based on the entire positive electrode were formulated therein, respectively. These were dispersed in an n-methylpyrrolidone (NMP) solvent to prepare a slurry. Thereafter, the slurry was applied on both surfaces of an aluminum alloy foil (purity: 99 wt %) having a thickness of 15 µm, dried, and subjected to a press process, to produce a positive electrode having a positive electrode material layer obtained by applying the slurry of an amount of 12.8 mg/cm² on one surface and having a thickness of 43 µm on one surface, and an electrode density of 3.2 g/cm³. The specific surface area of the positive electrode material layer was 0.5 m²/g.

Monoclinic $TiO_2(B)$ particles having an average particle diameter of secondary particle diameters of 5 µm, an average primary particle diameter of 0.3 µm, and a BET specific surface area of 20 m²/g were used as a negative electrode active material. Negative electrode active material particles, graphite powder having an average particle diameter of 5 µm and a BET specific surface area of 10 m²/g, and PVdF as a binder were formulated at a weight ratio of 90:6:4. These were dispersed in an n-methylpyrrolidone (NMP) solvent, and stirred under conditions of the number of rotations of 1000 rpm and a stirring time of 2 hours by use of a ball mill, to prepare a slurry. The obtained slurry was applied on an aluminum alloy foil (purity: 99.3 wt %) having a thickness of 15 µm, dried, and subjected to a press process, to produce a negative electrode having a negative electrode material layer obtained by applying the slurry of an amount of 13 mg/cm² on one surface and having a thickness of 59 µm on one surface, and an electrode density of 2.2 g/cm³. The porosity of the negative electrode except for a current collector was 35%. The BET specific surface area (surface area per 1 g of the negative electrode material layer) of the negative electrode material layer was 10 m²/g.

On the other hand, a nonwoven fabric separator having a thickness of 20 µm and made of cellulose was contacted with the positive electrode, to cover the positive electrode with the separator. Thereafter, the negative electrode was put thereon, and the negative electrode was opposed to the positive electrode with the separator interposed therebetween. These were spirally wound, to produce an electrode group. The electrode group was further pressed to form the electrode group into a flat shape. The electrode group was housed in a thin metal can (case) made of an aluminium alloy having a thickness of 0.3 mm (Al purity: 99 wt %).

$LiPF_6$ in an amount of 1.0 mol/L as an electrolyte was dissolved in a mixed solvent of trimethyl phosphate and propylene carbonate (PC) with volume ratio of 80:20 to prepare a liquid nonaqueous electrolyte (nonaqueous electrolytic solution). The nonaqueous electrolyte was poured into the electrode group in the case to produce a thin nonaqueous electrolyte battery having the structure shown in FIG. 1 and having a thickness of 4 mm, a width of 30 mm, and a height of 60 mm.

Examples 2 to 20

Thin nonaqueous electrolyte batteries were produced in the same manner as in Example 1 except that a composition of a nonaqueous solvent, a kind and concentration of an electrolyte, a negative electrode active material, a specific surface area of the negative electrode active material, and a positive electrode active material were set as shown in Tables 1 and 2.

Comparative Examples 1 to 7

Thin nonaqueous electrolyte batteries were produced in the same manner as in Example 1 except that a composition of a nonaqueous solvent, a kind and concentration of an electrolyte, a negative electrode active material, a specific surface area of the negative electrode active material, and a positive electrode active material were set as shown in Tables 1 and 2.

A method for measuring the negative electrode active material particles will be shown below.

The negative electrode active material particles were measured by use of a laser diffraction distribution measurement apparatus (Shimadzu SALD-300) by a method for first adding about 0.1 g of a sample, a surfactant, and 1 to 2 mL of purified water into a beaker; sufficiently stirring the mixture; pouring the mixture into an agitation bath; measuring the luminosity distribution 64 times at intervals of two seconds; and analyzing particle size distribution data.

The BET specific surface areas, based on $N_2$ adsorption, of the positive electrode active material particles, the positive electrode material layer, the negative electrode active material particles, and the negative electrode material layer were measured under the following conditions.

In the case of the active material particles of each of the positive electrode and the negative electrode, the amount of the sample for measurement was set to 1 g. For the positive electrode and the negative electrode, two small pieces of 2×2 cm² were cut out from each of the electrodes, which were used as the sample. A BET specific surface area measurement apparatus manufactured by Yuasa Ionics Co. was used, and nitrogen gas was used as an adsorption gas.

The porosity of the negative electrode is calculated by comparing the volume of the negative electrode material layer with the volume of the negative electrode material layer when the porosity is 0%, and considering the increment of the volume from the volume of the negative electrode material layer when the porosity is 0% as a pore volume. The volume of the negative electrode material layer is a total of the volumes of both sides of the negative electrode material layer in the case where the negative electrode material layer is formed on both sides of the collector.

The battery performances of Examples and Comparative Examples are measured under the conditions described below, and the results are shown in Tables 3 and 4.

The nonaqueous electrolyte battery was charged to 2.8 V at a constant current of 1 A at 25° C. for 1 hour. Thereafter, a discharge capacity when the nonaqueous electrolyte battery was discharged at 0.6 A (equivalent to 1 C) to 1.5 V was measured. The nonaqueous electrolyte battery was charged to 2.8 V at a constant current of 1 A at 25° C. for 1 hour. Thereafter, a discharge capacity when the nonaqueous electrolyte battery was discharged at a current value of 5 C to 1.5 V was measured. The discharge capacity at 0.6 A (equivalent to 1 C) was defined as 100%, and the discharge capacity obtained when being discharged at 5 C was represented, to obtain a 5 C discharge capacity maintenance rate. A high temperature cycle test was performed to repeat charge to 2.8 V at a constant current of 1 A at 45° C. for 1 hour and discharge at a constant current of 0.6 A to 1.5 V. Cycle life in the cycle test at 45° C. was the number of cycles at the capacity maintenance rate of 80% of an initial capacity.

Discharge capacities, 5 C discharge capacity maintenance rates, and high temperature cycle lives in Examples 18 to 21 and Comparative Examples 1 and 6 were measured under the same conditions as those of the nonaqueous electrolyte batteries of the other Examples and Comparative Examples except that a final charge voltage was changed from 2.8 V to 3.3 V, and a final discharge voltage was changed from 1.5 V to 2.5 V.

The nonaqueous electrolyte battery after full charge was left in a thermostat bath at 150° C. for 30 minutes, and the highest temperature of the surface of the battery was measured, to perform an oven test at 150° C.

TABLE 1

| | nonaqueous solvent composition | kind/concentration of electrolyte | negative electrode active material | specific surface area of negative electrode active material ($m^2/g$) | positive electrode active material |
|---|---|---|---|---|---|
| Example 1 | 80% trimethyl phosphate/20% PC | $LiPF_6$/1 mol/L | $TiO_2(B)$ | 20 | $LiMn_{0.85}Fe_{0.15}PO_4$ |
| Example 2 | 60% trimethyl phosphate/40% PC | $LiPF_6$/1 mol/L | $TiO_2(B)$ | 20 | $LiMn_{0.85}Fe_{0.15}PO_4$ |
| Example 3 | 30% trimethyl phosphate/70% PC | $LiPF_6$/1 mol/L | $TiO_2(B)$ | 20 | $LiMn_{0.85}Fe_{0.15}PO_4$ |
| Example 4 | 90% trimethyl phosphate/10% PC | $LiPF_6$/1 mol/L | $TiO_2(B)$ | 20 | $LiMn_{0.85}Fe_{0.15}PO_4$ |
| Example 5 | 80% trimethyl phosphate/20% PC | $LiPF_6$/1 mol/L | $Li_4Ti_5O_{12}$ | 20 | $LiMn_{0.9}Fe_{0.1}PO_4$ |
| Example 6 | 80% trimethyl phosphate/20% PC | $LiPF_6$/1 mol/L | $Nb_2TiO_7$ | 20 | $LiMn_{0.9}Fe_{0.1}PO_4$ |
| Example 7 | 80% triethyl phosphate/20% PC | $LiPF_6$/1 mol/L | $TiO_2(B)$ | 20 | $LiMn_{0.85}Fe_{0.15}PO_4$ |
| Example 8 | 80% tripropyl phosphate/20% PC | $LiPF_6$/1 mol/L | $TiO_2(B)$ | 20 | $LiMn_{0.85}Fe_{0.15}PO_4$ |
| Example 9 | 80% tributyl phosphate/20% PC | $LiPF_6$/1 mol/L | $TiO_2(B)$ | 20 | $LiMn_{0.85}Fe_{0.15}PO_4$ |
| Example 10 | 80% trimethyl phosphate/20% BC | $LiPF_6$/1 mol/L | $TiO_2(B)$ | 20 | $LiMn_{0.85}Fe_{0.15}PO_4$ |
| Example 11 | 80% trimethyl phosphate/20% EC | $LiPF_6$/1 mol/L | $TiO_2(B)$ | 20 | $LiMn_{0.85}Fe_{0.15}PO_4$ |
| Example 12 | 80% trimethyl phosphate/20% EMS | $LiPF_6$/1 mol/L | $TiO_2(B)$ | 20 | $LiMn_{0.85}Fe_{0.15}PO_4$ |
| Example 13 | 80% trimethyl phosphate/20% EiPS | $LiPF_6$/1 mol/L | $TiO_2(B)$ | 20 | $LiMn_{0.85}Fe_{0.15}PO_4$ |
| Example 14 | 80% trimethyl phosphate/20% PC | $LiPF_6$/1 mol/L | $TiO_2(B)$ | 30 | $LiMn_{0.85}Fe_{0.15}PO_4$ |
| Example 15 | 80% trimethyl phosphate/20% PC | $LiPF_6$/1 mol/L | $TiO_2(B)$ | 40 | $LiMn_{0.85}Fe_{0.15}PO_4$ |
| Example 16 | 80% trimethyl phosphate/20% PC | $LiPF_6$/1 mol/L | $TiO_2(B)$ | 50 | $LiMn_{0.85}Fe_{0.15}PO_4$ |

TABLE 2

| | nonaqueous solvent composition | kind/concentration of electrolyte | negative electrode active material | specific surface area of negative electrode active material ($m^2/g$) | positive electrode active material |
|---|---|---|---|---|---|
| Example 17 | 50% trifluoromethyl phosphate/50% EiPS | $LiPF_6$/1 mol/L | $Nb_2TiO_7$ | 5 | $LiNi_{0.5}Mn_{1.5}O_4$ |
| Example 18 | 50% trifluoroethyl phosphate/50% EiPS | $LiPF_6$/1 mol/L | $Nb_2TiO_7$ | 3 | $LiNi_{0.5}Mn_{1.5}O_4$ |
| Example 19 | 50% trimethyl phosphate/50% EiPS | $LiPF_6$/1 mol/L | $TiO_2(B)$ | 20 | $LiNi_{0.5}Mn_{1.5}O_4$ |
| Example 20 | 50% triethyl phosphate/50% EMS | $LiPF_6$/1 mol/L | $TiO_2(B)$ | 20 | $LiNi_{0.5}Mn_{1.5}O_4$ |
| Comparative Example 1 | 100% trimethyl phosphate | $LiPF_6$/1 mol/L | $Li_4Ti_5O_{12}$ | 2 | $LiNi_{0.5}Mn_{1.5}O_4$ |
| Comparative Example 2 | 80% diethyl carbonate/20% PC | $LiPF_6$/1 mol/L | $Li_4Ti_5O_{12}$ | 20 | $LiMn_{0.85}Fe_{0.15}PO_4$ |
| Comparative Example 3 | 80% diethyl carbonate/20% PC | $LiPF_6$/1 mol/L | $TiO_2(B)$ | 20 | $LiMn_{0.85}Fe_{0.15}PO_4$ |
| Comparative Example 4 | 100% PC | $LiPF_6$/1 mol/L | $TiO_2(B)$ | 20 | $LiMn_{0.85}Fe_{0.15}PO_4$ |
| Comparative Example 5 | 80% trimethyl phosphate/20% PC | $LiPF_6$/1 mol/L | $TiO_2(B)$ | 20 | $LiNi_{0.8}Mn_{0.1}Co_{0.1}O_2$ |
| Comparative Example 6 | 80% diethyl carbonate/20% PC | $LiPF_6$/1 mol/L | $TiO_2(B)$ | 20 | $LiNi_{0.5}Mn_{1.5}O_4$ |
| Comparative Example 7 | 80% trimethyl phosphate/20% GBL | $LiBF_4$/1 mol/L | $TiO_2(B)$ | 20 | $LiMn_{0.85}Fe_{0.15}PO_4$ |

TABLE 3

|  | discharge capacity at 25° C. (mAh) | 5 C discharge capacity maintenance rate (%) | cycle life at 45° C. (times) | highest temperature (° C.) of battery after 30 minutes from oven test at 150° C. |
|---|---|---|---|---|
| Example 1 | 700 | 65 | 4000 | 150 |
| Example 2 | 700 | 70 | 4500 | 150 |
| Example 3 | 680 | 60 | 4200 | 160 |
| Example 4 | 600 | 50 | 3500 | 150 |
| Example 5 | 600 | 60 | 5000 | 150 |
| Example 6 | 750 | 60 | 4500 | 150 |
| Example 7 | 650 | 60 | 3500 | 150 |
| Example 8 | 600 | 55 | 3400 | 150 |
| Example 9 | 600 | 50 | 3200 | 150 |
| Example 10 | 600 | 50 | 3500 | 150 |
| Example 11 | 720 | 65 | 4200 | 150 |
| Example 12 | 600 | 60 | 4000 | 150 |
| Example 13 | 600 | 50 | 4000 | 150 |
| Example 14 | 720 | 70 | 4000 | 150 |
| Example 15 | 750 | 75 | 3800 | 152 |
| Example 16 | 760 | 80 | 3500 | 155 |

TABLE 4

|  | discharge capacity at 25° C. (mAh) | 5 C discharge capacity maintenance rate (%) | cycle life at 45° C. (times) | highest temperature (° C.) of battery after 30 minutes from oven test at 150° C. |
|---|---|---|---|---|
| Example 17 | 700 | 70 | 2500 | 150 |
| Example 18 | 700 | 60 | 3000 | 150 |
| Example 19 | 650 | 75 | 1800 | 150 |
| Example 20 | 650 | 80 | 1500 | 150 |
| Comparative Example 1 | 500 | 30 | 500 | 150 |
| Comparative Example 2 | 450 | 60 | 4000 | 180 |
| Comparative Example 3 | 700 | 70 | 3000 | 190 |
| Comparative Example 4 | 500 | 30 | 3000 | 160 |
| Comparative Example 5 | 700 | 70 | 2000 | 200 |
| Comparative Example 6 | 650 | 50 | 200 | 200 |
| Comparative Example 7 | 500 | 30 | 500 | 150 |

As apparent from Tables 1 to 4, the nonaqueous electrolyte batteries of Comparative Examples 2 to 6 had the highest battery temperatures in the oven test, higher than those of the nonaqueous electrolyte batteries of Examples 1 to 20, and a thermal stability poorer than that of the nonaqueous electrolyte batteries of Examples 1 to 20. The nonaqueous electrolyte batteries of Comparative Examples 1 and 7 had the highest battery temperature of 150° C. in the oven test, and had a discharge capacity, a capacity maintenance rate at a 5 C large current discharge, and cycle life poorer than those of Examples 1 to 20. Examples 1 to 20 can have the highest battery temperature of 150 to 155° C. in the oven test, and attain the discharge capacity of 600 mAh or more, the 5 C discharge capacity maintenance rate of 50% or more, and the cycle life of 1500 or more.

Examples 21 to 31

Thin nonaqueous electrolyte batteries were produced in the same manner as in Example 1 except that a composition of a nonaqueous solvent, a kind and concentration of an electrolyte, a negative electrode active material, a specific surface area of the negative electrode active material, and a positive electrode active material were set as shown in Table 5.

Example 32

A positive electrode was produced in the same manner as in Example 1 except that one obtained by mixing a third oxide ($LiNi_{0.8}Mn_{0.1}Co_{0.1}O_2$) and a second metal phosphate ($LiMn_{0.85}Fe_{0.15}PO_4$) at a weight ratio of 1:1 was used as a positive electrode active material. A thin nonaqueous electrolyte battery was produced in the same manner as in Example 1 except that the obtained positive electrode was used.

A discharge capacity at 25° C., a 5 C discharge capacity maintenance rate, a cycle life at 45° C., and a highest battery temperature after an oven test were measured for the obtained nonaqueous electrolyte batteries of Examples under the same conditions as those described above. The results are shown in Table 6.

TABLE 5

| | nonaqueous solvent composition | kind/concentration of electrolyte | negative electrode active material | specific surface area of negative electrode active material (m²/g) | positive electrode active material |
|---|---|---|---|---|---|
| Example 21 | 50% trifluoromethyl phosphate/50% PC | LiPF$_6$/1 mol/L | TiO$_2$(B) | 20 | LiNi$_{0.8}$Mn$_{0.1}$Co$_{0.1}$O$_2$ |
| Example 22 | 50% trifluoroethyl phosphate/50% PC | LiPF$_6$/1 mol/L | TiO$_2$(B) | 20 | LiNi$_{0.8}$Mn$_{0.1}$Co$_{0.1}$O$_2$ |
| Example 23 | 50% trifluoropropyl phosphate/50% PC | LiPF$_6$/1 mol/L | TiO$_2$(B) | 20 | LiNi$_{0.8}$Mn$_{0.1}$Co$_{0.1}$O$_2$ |
| Example 24 | 50% trifluorobutyl phosphate/50% PC | LiPF$_6$/1 mol/L | TiO$_2$(B) | 20 | LiNi$_{0.8}$Mn$_{0.1}$Co$_{0.1}$O$_2$ |
| Example 25 | 50% trifluoroethyl phosphate/50% PC | LiPF$_6$/1 mol/L | Li$_4$Ti$_5$O$_{12}$ | 10 | LiNi$_{0.8}$Mn$_{0.1}$Co$_{0.1}$O$_2$ |
| Example 26 | 50% trifluoroethyl phosphate/50% PC | LiPF$_6$/1 mol/L | Nb$_2$TiO$_7$ | 10 | LiNi$_{0.8}$Mn$_{0.1}$Co$_{0.1}$O$_2$ |
| Example 27 | 50% trifluoroethyl phosphate/25% PC/25% DEC | LiPF$_6$/1 mol/L | Nb$_2$TiO$_7$ | 10 | LiNi$_{0.6}$Mn$_{0.2}$Co$_{0.2}$O$_2$ |
| Example 28 | 50% trifluoroethyl phosphate/25% PC/25% DEC | LiPF$_6$/1 mol/L | Nb$_2$TiO$_7$ | 10 | LiNi$_{0.5}$Mn$_{0.2}$Co$_{0.3}$O$_2$ |
| Example 29 | 30% trifluoroethyl phosphate/40% PC/30% DEC | LiPF$_6$/1 mol/L | Nb$_2$TiO$_7$ | 10 | LiNi$_{0.3}$Mn$_{0.4}$Co$_{0.3}$O$_2$ |
| Example 30 | 50% trifluoroethyl phosphate/25% PC/25% DEC | LiPF$_6$/1 mol/L | Nb$_2$TiO$_7$ | 10 | LiNi$_{0.8}$Mn$_{0.1}$Co$_{0.1}$O$_2$ |
| Example 31 | 60% trifluoroethyl phosphate/20% PC/20% DEC | LiPF$_6$/1 mol/L | Nb$_2$TiO$_7$ | 10 | LiNi$_{0.8}$Mn$_{0.1}$Co$_{0.1}$O$_2$ |
| Example 32 | 50% trifluoroethyl phosphate/50% PC | LiPF$_6$/1 mol/L | TiO$_2$(B) | 20 | LiNi$_{0.8}$Mn$_{0.1}$Co$_{0.1}$O$_2$ LiMn$_{0.85}$Fe$_{0.15}$PO$_4$ |

TABLE 6

| | discharge capacity at 25° C. (mAh) | 5 C discharge capacity maintenance rate (%) | cycle life at 45° C. (times) | highest temperature (° C.) of battery after 30 minutes from oven test at 150° C. |
|---|---|---|---|---|
| Example 21 | 700 | 70 | 4500 | 155 |
| Example 22 | 800 | 75 | 5500 | 155 |
| Example 23 | 700 | 65 | 4500 | 155 |
| Example 24 | 750 | 60 | 4000 | 155 |
| Example 25 | 650 | 80 | 7000 | 150 |
| Example 26 | 1000 | 80 | 6000 | 150 |
| Example 27 | 950 | 85 | 6500 | 155 |
| Example 28 | 800 | 85 | 6800 | 155 |
| Example 29 | 750 | 85 | 7000 | 150 |
| Example 30 | 820 | 85 | 6000 | 160 |
| Example 31 | 830 | 80 | 6500 | 160 |
| Example 32 | 750 | 65 | 6000 | 152 |

The comparison of the results of Tables 5 and 6 with the results of Tables 1 to 4 shows that the discharge capacities at 25° C., 5 C discharge capacity maintenance rates, and highest battery temperatures after an oven test, of the batteries of Examples 21 to 32 which contain the positive electrode containing the third oxide and the nonaqueous electrolyte containing fluorinated phosphate esters are equal to or higher than those of Examples 1 to 20, and the charge/discharge cycles at a high temperature such as 45° C., of the batteries of Examples 21 to 32 are more excellent than those of Examples 1 to 20.

Since the nonaqueous electrolyte batteries of at least one embodiment and Examples described above contain the positive electrode containing at least one oxide selected from the group consisting of the first oxide having the spinel structure and represented by Li$_x$Ni$_{0.5}$Mn$_{1.5}$O$_4$ (0<x≤1.1), and the second metal phosphate having the olivine structure and represented by Li$_x$Mn$_{1-w}$Fe$_w$PO$_4$ (0<x≤1.1, 0≤w≤0.5), the negative electrode containing the titanium-containing oxide, and the nonaqueous electrolyte containing the first solvent and LiPF$_6$, the nonaqueous electrolyte battery having excellent cycle performance, thermal stability, and discharge rate performance under a high temperature environment can be attained.

Since the nonaqueous electrolyte batteries of at least one embodiment and Examples described above contains the positive electrode containing at least one oxide selected from the group consisting of the first oxide having the spinel structure and represented by Li$_x$Ni$_{0.5}$Mn$_{1.5}$O$_4$ (0<x≤1.1), the second metal phosphate having the olivine structure and represented by Li$_x$Mn$_{1-w}$Fe$_w$PO$_4$ (0<x≤1.1, 0≤w≤0.5), and the third oxide having the layered structure and represented by Li$_x$Ni$_y$Mn$_z$Co$_{1-y-z}$O$_2$ (0<x≤1.1, 0.3≤y<1, 0≤z≤0.5), the negative electrode containing the titanium-containing oxide, and the nonaqueous electrolyte containing the first solvent, the nonaqueous electrolyte battery having excellent cycle performance, thermal stability, and discharge rate performance under a high temperature environment can be attained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
a positive electrode comprising at least one selected from the group consisting of a first oxide having a spinel structure and represented by $Li_xNi_{0.5}Mn_{1.5}O_4$ ($0<x\leq1.1$) and a second metal phosphate having an olivine structure and represented by $Li_xMn_{1-w}Fe_wPO_4$ ($0<x\leq1.1$, $0\leq w\leq 0.5$);
a negative electrode comprising a titanium-containing oxide; and
a nonaqueous electrolyte comprising a nonaqueous solvent and $LiPF_6$ dissolved in the nonaqueous solvent, wherein the nonaqueous solvent comprises:
a first solvent comprising at least one compound selected from the group consisting of trimethyl phosphate, triethyl phosphate, tripropyl phosphate, tributyl phosphate, and fluorinated phosphate esters thereof, and
a second solvent comprising at least one selected from the group consisting of propylene carbonate, ethylene carbonate, butylene carbonate, diethyl carbonate, ethylmethyl sulfone, and ethylisopropyl sulfone, wherein a content of the first solvent in the nonaqueous solvent is 30 to 90% by volume.

2. The nonaqueous electrolyte battery according to claim 1, wherein the titanium-containing oxide comprises at least one selected from the group consisting of a lithium titanium oxide, a titanium oxide, and a niobium titanium composite oxide.

3. The nonaqueous electrolyte battery according to claim 2, wherein the titanium-containing oxide comprises a niobium titanium composite oxide represented by $Li_xNb_aTi_bO_c$ ($0\leq x\leq 3$, $0<a\leq 3$, $0<b\leq 3$, $5\leq c\leq 10$).

4. The nonaqueous electrolyte battery according to claim 1, wherein the titanium-containing oxide comprises a lithium titanium oxide represented by $Li_{4+x}Ti_5O_{12}$ ($-1\leq x\leq 3$).

5. The nonaqueous electrolyte battery according to claim 1, wherein the fluorinated phosphate ester comprise at least one selected from the group consisting of trifluoromethyl phosphate, trifluoroethyl phosphate, trifluoropropyl phosphate, and trifluorobutyl phosphate.

6. The nonaqueous electrolyte battery according to claim 1, wherein content of the first solvent in the nonaqueous solvent is 40 to 80% by volume.

7. A battery pack comprising the nonaqueous electrolyte battery according to claim 1.

8. The battery pack according to claim 7, wherein the nonaqueous electrolyte battery is provided in plural, and the plural nonaqueous electrolyte batteries are electrically connected in series, in parallel, or in combination of series connection and parallel connection.

9. The battery pack according to claim 7, further comprising a protective circuit and an external energizing terminal.

10. The nonaqueous electrolyte battery according to claim 1, wherein the positive electrode comprises the first oxide having a spinel structure and represented by $Li_xNi_{0.5}Mn_{1.5}O_4$ ($0<x\leq1.1$).

11. The nonaqueous electrolyte battery according to claim 1, wherein the positive electrode comprises the second metal phosphate having an olivine structure and represented by $Li_xMn_{1+w}Fe_wPO_4$ ($0<x\leq1.1$, $0\leq w\leq 0.5$).

12. The nonaqueous electrolyte battery according to claim 1, wherein the positive electrode comprises both the first oxide having a spinel structure and represented by $Li_xNi_{0.5}Mn_{1.5}O_4$ ($0<x\leq1.1$) and the second metal phosphate having an olivine structure and represented by $Li_xMn_{1+w}Fe_wPO_4$ ($0<x\leq1.1$, $0\leq w\leq 0.5$).

13. A vehicle, comprising the battery pack according to claim 7.

* * * * *